United States Patent Office 3,714,300
Patented Jan. 30, 1973

3,714,300
BIS-(HINDERED PHENOL)-ALKYLENE DIPHOSPHONATES AND PHOSPHONOACETATES
John D. Spivack, Spring Valley, N.Y., assignor to Ciba-Geigy Corporation, Ardsley, N.Y.
No Drawing. Filed May 19, 1969, Ser. No. 825,953
Int. Cl. C07f *9/40;* C08f *45/98*
U.S. Cl. 260—932                 9 Claims

ABSTRACT OF THE DISCLOSURE

Bis-(hindered phenol)-alkylene diphosphonates and phosphonoacetates prepared by hydroxyaryl alkylation procedures, are stabilizers of organic material subject to oxidative deterioration.

DETAILED DESCRIPTION

This invention relates to bis-(hindered phenol)-alkylene diphosphonate and phosphonoacetate compounds and compositions otherwise subject to oxidative deterioration stabilized by the incorporation therein of said compounds.

In particular the present invention pertains to bis-(hindered phenol)-phosphonates and phosphonoacetates having the formula:

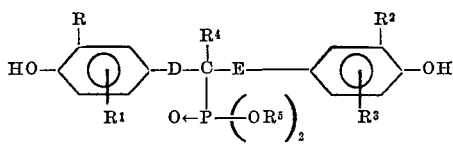

wherein

R, $R^1$, $R^2$ and $R^3$ are alkyl groups having 1 to 18 carbon atoms or cycloalkyl having 5 to 12 carbon atoms,
$R^4$ is a phosphoryl group of the formula:

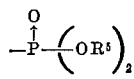

or

or carbalkoxy of the formula

wherein $R^6$ is alkyl, phenyl or alkylphenyl of up to 18 carbon atoms,
$R^5$ is alkyl, alkaryl or aralkyl having up to 30 carbon atoms or alkylthio (lower) alkyl where the alkyl has up to 30 and the (lower) alkyl up to 6 carbon atoms,
D and E are alkylene groups independently having from 1 to 6 carbon atoms.

By the term "alkyl" and "alkylene," is intended groups containing branched or straight chains. Representative alkyl groups are methyl, ethyl, propyl, isopropyl, butyl, t-butyl, octyl, t-octyl, decyl, dodecyl, octadecyl, tetracosyl, triacontyl and the like. Representative alkylene groups are methylene, ethylene, propylene, isopropylene, butylene, t-butylene, hexylene and the like. Cycloalkyl groups are illustrated by cyclopentyl, cyclohexyl, cyclooctyl, cyclodecyl, cyclododecyl and the like. Illustrative examples of alkylthio (lower) alkyl group are methylthioethyl, hexylthiomethyl, decylthioethyl, dodecylthiobutyl, hexadecylthiohexyl, tetradecylthioethyl, triacontylthioethyl and the like. Aralkyl are illustrated by benzyl, phenylethyl, 6-phenylhexyl, 12-phenyldodecyl, 12-α-napthyldodecyl, 24-phenyltetracosyl, 30-phenyltriacontyl and the like.

In the above formula the phenolic group has two alkyl substituents. One alkyl substituent is in a position ortho to the hydroxy group and a second alkyl group is either (a) in the other position ortho to the hydroxy group or (b) in the position meta to the hydroxy group and para to the first alkyl group. Preferred are the dialkyl-4-hydroxyphenyl groups wherein the alkyl groups are branched groups such as t-butyl or t-octyl. However, other arrangements are also contemplated, such as 3-t-butyl-6-methyl-4-hydroxyphenyl group, 3,5-diisopropyl-4-hydroxyphenyl group, 3,5-di-t-octyl-4-hydroxyphenyl group, 3,5-dimethyl-4-hydroxyphenyl group or 3,5-di-n-octadecyl-4-hydroxyphenyl group.

In a preferred embodiment, R, $R^1$, $R^2$ and $R^3$ are lower alkyl groups having up to 8 carbon atoms, especially tertiary alkyl groups such as tert-butyl, tert-amyl, tert-octyl and the like. The alkylene groups are preferably methylene. $R^4$ is preferably a carbalkoxy group having the formula

where $R^5$ is a hydrocarbon group having up to 30 carbon atoms or a phosphoryl group. Illustrative examples of said carbalkoxy group are ethyl acetate, butyl acetate, hexyl acetate, octyl acetate and the like. Illustrative examples of said group are diethyl phosphoryl, dimethyl phosphoryl, dibutyl phosphoryl, dihexyl phosphoryl, dioctyl phosphoryl and the like. $R^5$ is preferably an alkyl group having up to 30 carbon atoms.

There are a number of applicable methods of the preparation of the compounds of this invention. For example, in preparing bis-(hindered hydroxybenzyl)-phosphonoalkanoates, a hindered hydroxybenzyl halide is reacted with a phosphonoalkanoate to give the desired product. Similarly, in preparing bis-(hindered hydroxybenzyl)-phosphonates, a hindered hydroxybenzyl halide is reacted with the desired bis-phosphonate. The various preparations are described in greater detail in Examples 1 to 5 below for illustrative purposes.

EXAMPLE I

Preparation of triethyl-bis-(3,5-di-t-butyl-4-hydroxy benzyl)-phosphonoacetate

In 200 parts by volume of t-butanol was dissolved 3.9 parts of potassium. One-half of this solution was aded at room temperature to 11.2 parts of triethylphosphonoacetate, followed by the dropwise addition of 14.5 parts of 3,5-di-t-butyl-4-hydroxybenzyl chloride dissolved in 50 parts by volume of toluene. Thereafter, the remaining portion of the potassium solution was added followed by the addition of 14.5 parts of 3,5-di-t-butyl-4-hydroxybenzyl chloride. Then 300 parts of water was added to the reaction mixture and the product was extracted with benzene. After drying, benzene was stripped under reduced pressure yielding 33 parts of crude product. Upon recrystallization from a 1:1 mixture on n-hexane and petroleum ether and from n-heptane, triethyl-bis-(3,5-di-t-butyl-4-hydroxybenzyl)-phosphonoacetate was obtained (melting point 156 to 158° C.)

*Elemental analysis.*—Calculated (percent): C, 69.07; H, 9.30; P, 4.69. Found (percent): C, 69.32; H, 9.66; P, 4.71.

If tris(p-tert-octylphenyl)phosphonoacetate is reacted according to the conditions of Example 1, the product obtained is tris-(p-tert-octylphenyl)-α,α-bis-(3,5-di-t-butyl-4-hydroxybenzyl)phosphonoacetate.

EXAMPLE 2

Tri-n-triacontyl-bis-(3,5-di-tert-butyl-4-hydroxybenzyl) phosphonoacetate

If tri-n-triacontylphosphonoacetate is reacted according to the conditions of Example 1, then tri-n-triacontyl-α,α-bis-(3,5-di-t-butyl-4 - hydroxybenzyl)phosphonacetate is prepared.

EXAMPLE 3

Preparation of tetraethyl α,α-bis-(3,5-di-t-butyl-4-hydroxybenzyl)methylenediphosphonate To a solution of 4 parts of potassium in 200 parts by volume of t-butanol prepared as in Example 1 were added 14.5 parts of tetraethyl methylene-bis-phosphonate. While maintaining the reaction mixture at a temperature of about 50° C., 29 parts of 3,5-di-t-butyl-4-hydroxybenzyl chloride was added dropwise. The reaction mixture was then stirred at room temperature for 2 hours and acidified with 5 parts of glacial acetic acid. 500 parts of water was then added and the product extracted with ether and benzene. The combined extracts were washed with water, dried and the solvent evaporated under reduced pressure. The residue was triturated with petroleum ether and recrystallized from methanol yielding the product, tetraethyl methylene-α,α-bis-(3,5-di-t-butyl-4 - hydroxybenzyl) methylenediphosphonate.

*Elemental analysis.*—Calculated (percent): C, 64.61; H, 9.18; P, 8.54. Found (percent): C, 64.70; H, 9.15; P, 8.46.

EXAMPLE 4

If 28 parts of 3-methyl-6-tert-octyl-4(1-chloroethyl) phenol is reacted as described in Example 3, the tetraethyl-α,α-bis(3-methyl-5-t - octyl - 4 - hydroxyphenyl-α'-ethyl)methylene-diphosphonate is prepared.

In a similar manner tetraethyl-α,α-bis(3-tert-butyl-5-tert-octyl-4-hydroxyphenyl - α' - hexyl)methylenediphosphonate is prepared when 2-tert-butyl-6-tert-octyl-4-(1-chloro-n-hexyl)phenol is reacted as described in Example 3.

EXAMPLE 5

Preparation of tetra-n-octyl-α,α-bis-(3,5-di-t-butyl-4-hydroxybenzyl)methylenediphosphonate (A) Di-n-octyl chloromethanephosphonate: A mixture of 143 parts of n-octyl alcohol and 101 parts of triethylamine was added dropwise at room temperature to a solution of 838 parts of chloromethanephosphonyl dichloride dissolved in 100 parts by volume of benzene. The reaction mixture was stirred for 16 hours and then filtered. To the filtrate was added 150 parts by volume of ether, 100 parts by volume of 5% aqueous sodium bicarbonate, a small saturated aqueous sodium chloride solution and 700 parts by volume of n-heptane. The organic phase was separated, dried over anhydrous sodium sulfate and evaporated at reduced pressure. The product, di-n-octyl chloromethanephosphonate was isolated from the residue by distillation at 185° to 188° C. at 1.2 to 1.5 mm. of pressure.

*Elemental analysis.*—Calculated (percent): Chlorine, 9.99. Found (percent): Chlorine, 10.08.

(B) Tetra-n-octyl methylenediphosphonate: A sodium dispersion (2.3 parts) and 150 parts by volume of xylene was prepared at 120° C. with rapid stirring. After the dispersion was cooled to room temperature di-n-octylphosphite was added and the reaction mixture was heated for about 30 minutes at 60° C. Thereafter 35.4 parts of di-n-octyl chloromethylphosphonate was added at 40° to 70° C. over a period of 1 hour and the reaction mixture was heated at 65° C. for about 2 hours. The reaction mixture was then filtered and the filtrate distilled at an initial pressure of 20 and final pressure of 1 mm. Hg.

The product, tetra-n-octyl methylenediphosphonate, was isolated as a residual oil after topping off volatile by-products in a molecular still at a wall temperature of 180° C. and a pressure of 1 to 3 mm. Hg.

*Elemental analysis.*—Calculated (percent): P, 9.92. Found (percent): P, 9.92, 9.99.

(C) Tetra-n-octyl-α,α-bis-(3,5-di-t-butyl - 4 - hydroxybenzyl)-methylenediphosphonate: To a solution of 0.88 part of potassium in 100 parts by volume of t-butanol was added 6.24 parts of tetra-n-octyl methylenediphosphonate at room temperature followed by a dropwise addition of 8.4 parts of 3,5-di-t-butyl-4-hydroxybenzyl chloride at a temperature of about 50° C. The reaction mixture was kept at about 50° to 60° C. for 1 hour, cooled to room temperature and 200 parts by volume of ether added thereto. The reaction mixture was then acidified with 5 parts of glacial acetic acid, washed with water and the organic phase separated, dried over anhydrous sodium sulfate and the solvent removed at a reduced pressure. The residue (13.3 parts) was triturated with acetonitrile and then recrystallized first from a mixture of acetonitrile and methanol and finally from acetonitrile. The product, tetra-n-octyl-α,α-bis-(3,5 - di - t - butyl - 4-hydroxybenzyl)-methylenediphosphonate had a melting point of 127° to 129° C.

*Elemental analysis.*—Calculated (percent): C, 71.30; H, 10.82. Found (percent): C, 71.17; H, 10.92.

If tetra-p-t-octylphenyl methylenediphosphonate is reacted with 3,5-di-t-butyl-4-hydroxybenzyl chloride as in Example 5(C), the product obtained is tetra-(p-t-octylphenyl)-α,α-bis-(3,5 - di - t - butyl - 4 - hydroxybenzyl)-methylenediphosphonate.

The bis-(hindered phenol)-alkylene diphosphonates and phosphonoacetates of the present invention are stabilizers of organic materials normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetraceproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition. A particularly advantageous range for polyolefins such as polypropylene is from about 0.01% to about 5%.

The stabilizers employed in this invention may be used alone or in combination with other stabilizers or additive materials. Especially useful in certain cases is a composition containing an active compound of the present invention with the stabilizer dilauryl β-thiodipropionate or distearyl β-thiodipropionate.

Furthermore, compounds of the formula:

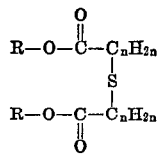

wherein

R is an alkyl group having from 6 to 24 carbon atoms; and n is an integer from 1 to 6, are useful stabilizers in combination with the novel antioxidant compounds of the present invention.

Other antioxidants, antiozonants, thermal stabilizers, ultraviolet light absorbers, coloring materials, dyes, pigments, metal chelating agents, etc., and light stabilizers may also be used, in combination, with the active compounds of the present invention.

OVEN AGING TEST

Unstabilized polypropylene powder (Hercules Profax 6501) is thoroughly blended with an antioxidant. The blended material is then milled on a two roller mill at 182° C. for 10 minutes after which time the stabilized polypropylene is sheeted from the mill and allowed to cool.

The milled polypropylene sheet is then cut into small pieces and pressed for 7 minutes on a hydraulic press at 218° C. and 2000 pounds per square inch pressure. The resultant sheet of 25 mil thickness is cut into small plaques and tested for resistance to accelerated aging in a forced draft oven at 150° C.

When unstabilized polypropylene is tested as described above its oven life is about 3 hours.

FADEOMETER TEST

The 25 mil plaques prepared as described in the Oven Aging Test are placed on a white card stock background and exposed in a Fadeometer. The specimens are tested for embrittlement at 20 hours intervals by bending them 180°. The result of this test is recorded as the number of hours the specimen stayed in the Fadeometer until a clean break is obtained.

Unstabilized polypropylene tested in a Fadeometer as noted above will generally fail after 40 to 60 hours.

The following examples are intended to illustrate further the nature of the present invention without introducing any limitations.

EXAMPLE 6

Using the procedure described above, polypropylene was stabilized with 0.5% by weight of triethyl-bis-(3,5-di-t - butyl - 4 - hydroxybenzyl)phosphonoacetate. The thus stabilized polypropylene was submitted to the Oven Aging Test and Fadeometer Test yielding the following results:

|  | Hrs. |
|---|---|
| Oven Aging | 175 |
| Fadeometer | 160 |

This example was repeated in which polypropylene was stabilized with 0.1% by weight of the above stabilizer and 0.5% by weight of dilaurylthiodipropionate. This composition in an Oven Aging Test had a life of 525 hours.

EXAMPLE 7

Using the above described procedure, polypropylene was stabilized with 0.5% by weight of tetraethyl methylene-bis-(3,5-di-t-butyl-4-hydroxybenzylphosphonate).

On testing, the following results were obtained:

|  | Hrs. |
|---|---|
| Oven Aging Test | 300 |
| Fadeometer Test | 180 |

Similar stabilization results are obtained when said compound is added in the amount of 0.1, 0.25 and 1.0% by weight to polyethylene, polypropylene, polybutadiene, polystyrene, butadiene-styrene copolymer, polyvinylchloride and polyamide.

This example was repeated in which polypropylene was stabilized with 0.1% by weight of the above stabilizer and 0.5% by weight of dilaurylthiodipropionate. The Oven Aging Test result was 470 hours.

EXAMPLE 8

The procedure of Example 6 was repeated except that 0.5% by weight of tetra-n-octyl-α,α-bis-(3,5-di-t-butyl-4-hydroxybenzyl) - methylenediphosphonate was employed. The test results were:

|  | Hrs. |
|---|---|
| Oven Aging Test | 510 |
| Fadeometer Test | 240 |

Comparable stabilization of polypropylene is obtained when in the above example said stabilizer is used in the amount of 0.01%.

This example was repeated in which polypropylene was stabilized with 0.1% by weight of said stabilizer and 0.5% by weight of dilaurylthiodipropionate. The test results of this composition were as follows:

|  | Hrs. |
|---|---|
| Oven Aging Test | 755 |
| Fadeometer Test | 240 |

Similarly good results are obtained when polyisoprene, polyurethane, polymethylene terephthalate, polyacetal and polyethyleneoxide are stabilized with tetraethyl-α,α-bis-(3-methyl-5-tert-octyl - 4 - hydroxyphenyl - α' - ethyl) methylenediphosphonate, both alone and in combination with a synergist such as dilaurylthiodiproponate or distearylthiodipropionate.

EXAMPLE 9

Stabilized gasoline is prepared by incorporating into gasoline having no additives and no stabilizers therein 0.05% by weight of tetraethyl-α,α-bis(3-tert-butyl-5-tert-octyl-4-hydroxyphenyl-α'-hexyl)methylenediphosphonate.

EXAMPLE 10

Paraffin wax (M.P. 125–128° F.) is stabilized by incorporating therein 0.001% by weight of tetra-n-octyl-α,α-bis(3,5-di-t-butyl - 4 - hydroxybenzyl) - methylenediphosphonate.

EXAMPLE 11

A stabilized high temperature lubricating oil is prepared by incorporating 2% by weight of tris-(p-tert-octylphenyl)-bis-(3,5-di-t-butyl - 4 - hydroxybenzyl)phosphonoacetate into the lubricant, which comprises diisoamyladipate.

EXAMPLE 12

High impact polystyrene resin containing elastomer (i.e., butadiene-styrene) is stabilized against loss of elongation properties by incorporation of 0.5% by weight of tetra - (p-t-octylphenyl)-α,α-bis-(3,5-di-t-butyl-4-hydroxybenzyl)-methylenediphosphonate.

EXAMPLE 13

A mixture of 1 kilogram of polyoxymethylene di-acetate (molecular weight of about 30,000), 5 g. of tri-n-octadecyl-bis(3,5-di - t - butyl - 4 - hydroxybenzyl)phosphonoacetate and 2 g. of dicyandiamide are extruded at 220° C. to yield a stabilized product.

EXAMPLE 14

A mixture of 1 M nylon 6,6 salt (hexamethylene diamine adipate) 0.01 M hexamethylene diamine and 1% by weight of triethyl-bis-(3,5-di-t-butyl-4-hydroxybenzyl) phosphonoacetate are added to a polymerization tube and heated for one hour at 220° C. and atmospheric pressure. The temperature is then raised to 285° C. and the pressure reduced slowly to 1 mm. The tube is maintained under these conditions for 30 minutes, cooled and flushed with nitrogen.

The thus stabilized polyhexamethylene diamine adipate shows less color development and weight loss than does an unstabilized sample.

What is claimed is:

1. A compound of the formula:

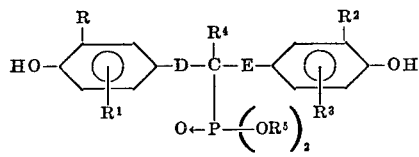

wherein
R, R¹, R² and R³ are alkyl groups having 1 to 18 carbon atoms or cycloalkyl having from 5 to 12 carbon atoms, R⁴ is a phosphoryl group of the formula:

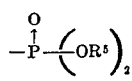

or

or carbalkoxy of the formula

where
R⁶ is alkyl, phenyl or alkylphenyl of up to 18 carbon
R⁵ is alkyl or aralkyl having up to 30 carbon atoms or alkaryl having up to 14 carbon atoms.
D and E are alkylene groups independently having from 1 to 6 carbon atoms.

2. A compound of claim 1 wherein R, R¹, R² and R³ are lower alkyl groups.

3. A compound of claim 2 wherein said lower alkyl groups are ortho to the hydroxy groups.

4. A compound of claim 1 wherein R⁴ is

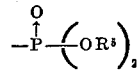

or

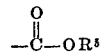

wherein the two R⁵ groups are independently selected from the lower alkyl groups.

5. A compound of claim 1 wherein R⁵ is a lower alkyl group.

6. A compound according to claim 1, said compound being triethyl-bis-(3,5-di-tert-butyl - 4 - hydroxybenzyl) phosphonoacetate.

7. A compound according to claim 1, said compound being triethyl α,α-bis-(3,5-di-tert-butyl-4-hydroxybenzyl)-methylenediphosphonate.

8. A compound according to claim 1, said compound being tetraethyl α,α-bis - (3,5 - di-tert-butyl-4-hydroxybenbenzyl)-methylenediphosphonate.

9. Compounds of the formula

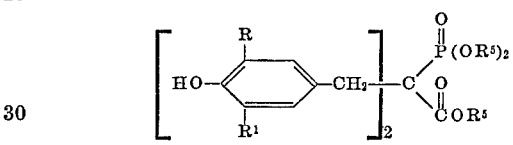

wherein
R and R¹ are alkyl of 1 to 4 carbon atoms, and
R⁵ is alkyl or aralkyl of 1 to 20 carbon atoms.

References Cited

Ileopulos: "Tetrahedron Letters," No. 5, pp. 609–612, 1968.

LEWIS GOTTS, Primary Examiner

A. H. SUTTO, Assistant Examiner

U.S. Cl. X.R.

44—76, DIG. 4; 252—400, 404; 260—45.95, 14.85